(12) United States Patent
Ohnishi et al.

(10) Patent No.: US 12,093,479 B2
(45) Date of Patent: *Sep. 17, 2024

(54) CONTROL DEVICE, CONTROL METHOD, AND NON-TRANSITORY COMPUTER READABLE MEDIUM

(71) Applicant: KABUSHIKI KAISHA TOKAI RIKA DENKI SEISAKUSHO, Aichi (JP)

(72) Inventors: Takeshi Ohnishi, Aichi (JP); Fumiaki Hirose, Aichi (JP); Yuma Nakai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 185 days.

This patent is subject to a terminal disclaimer.

(21) Appl. No.: 17/640,950

(22) PCT Filed: Apr. 17, 2020

(86) PCT No.: PCT/JP2020/016824
§ 371 (c)(1),
(2) Date: Mar. 7, 2022

(87) PCT Pub. No.: WO2021/049080
PCT Pub. Date: Mar. 18, 2021

(65) Prior Publication Data
US 2022/0334667 A1    Oct. 20, 2022

(30) Foreign Application Priority Data
Sep. 10, 2019   (JP) .................................. 2019-164225

(51) Int. Cl.
G06F 3/041   (2006.01)
G06F 3/01    (2006.01)

(52) U.S. Cl.
CPC ............ *G06F 3/0416* (2013.01); *G06F 3/016* (2013.01)

(58) Field of Classification Search
CPC .... G06F 3/0416; G06F 3/016; G06F 3/03547; G06F 3/038; B06B 1/045; B06B 1/0207; A63F 13/2145; A63F 13/285
See application file for complete search history.

(56) References Cited

U.S. PATENT DOCUMENTS 10,395,489 B1 *  8/2019  Cruz-Hernandez ..... G06F 3/016
10,477,355 B1 * 11/2019  Niranjayan ........... A61B 5/1113
(Continued)

FOREIGN PATENT DOCUMENTS

JP    2010-287231    12/2010
JP    2017-117427     6/2017

OTHER PUBLICATIONS

International Search Report issued in International Bureau of WIPO Patent Application No. PCT/JP2020/016824, dated Jul. 7, 2020.
(Continued)

*Primary Examiner* — William Lu
(74) *Attorney, Agent, or Firm* — GREENBLUM & BERNSTEIN P.L.C.

(57) ABSTRACT

A control device including a control section configured to vibrate a contact region in a case where it is determined that an operation is performed on an input section by a target object coming into contact with the contact region, the input section having the contact region touched by the target object, wherein the control section adjusts displacement rise time as a control parameter for performing control of vibrating the contact region.

9 Claims, 5 Drawing Sheets

(56) References Cited

U.S. PATENT DOCUMENTS

| | | | | |
|---|---|---|---|---|
| 10,504,342 | B1* | 12/2019 | Khoshkava | G08B 6/00 |
| 2010/0079554 | A1* | 4/2010 | Tsukamoto | B41J 2/1632 |
| | | | | 29/25.35 |
| 2010/0309142 | A1 | 12/2010 | Cruz-Hernandez et al. | |
| 2012/0229401 | A1* | 9/2012 | Birnbaum | G06F 3/016 |
| | | | | 345/173 |
| 2012/0286944 | A1* | 11/2012 | Forutanpour | G06F 3/016 |
| | | | | 340/407.1 |
| 2015/0193983 | A1* | 7/2015 | Katz | G06F 1/00 |
| | | | | 345/419 |
| 2016/0259480 | A1* | 9/2016 | Augenbergs | G01L 5/0028 |
| 2017/0358181 | A1* | 12/2017 | Moussette | G08B 6/00 |
| 2017/0365139 | A1* | 12/2017 | Levesque | G06F 3/016 |
| 2018/0081455 | A1* | 3/2018 | Huston | G06F 3/03545 |
| 2018/0321748 | A1* | 11/2018 | Rao | G06F 3/016 |
| 2019/0189889 | A1* | 6/2019 | Benedict | G06F 3/016 |
| 2019/0191582 | A1* | 6/2019 | Olien | H02N 2/028 |
| 2020/0245975 | A1* | 8/2020 | Moehring | A61B 8/485 |
| 2022/0334642 | A1* | 10/2022 | Ohnishi | G05B 13/024 |
| 2022/0334643 | A1* | 10/2022 | Ohnishi | G06F 3/016 |
| 2022/0334666 | A1* | 10/2022 | Ohnishi | B06B 1/0215 |
| 2022/0334667 | A1* | 10/2022 | Ohnishi | G06F 3/03547 |
| 2022/0404398 | A1* | 12/2022 | Reynaga | G01R 27/02 |

OTHER PUBLICATIONS

Written Opinion issued in International Bureau of WIPO Patent Application No. PCT/JP2020/016824, dated Jul. 7, 2020.

* cited by examiner

CONTROL DEVICE, CONTROL METHOD, AND NON-TRANSITORY COMPUTER READABLE MEDIUM

TECHNICAL FIELD

The present invention relates to a control device, a control method, and a non-transitory computer readable medium.

BACKGROUND ART

In recent years, technologies of outputting feedback in response to a user operation have been considered. For example, Patent Literature 1 listed below discloses a technology of giving tactile feedback to a user by vibrating an operation receiver in the case where the user has pressed the operation receiver.

CITATION LIST

Patent Literature

Patent Literature 1: JP 2010-287231A

DISCLOSURE OF INVENTION

Technical Problem

However, according to the technology disclosed in the above Patent Literature 1, the mere vibration is given as the feedback. Therefore, the feedback has no meaning other than informing the user whether or not the user operation has been accepted.

Accordingly, the present invention is made in view of the aforementioned issues, and an object of the present invention is to provide a mechanism that makes it possible to improve expressiveness of the feedback.

Solution to Problem

To solve the above described problem, according to an aspect of the present invention, there is provided a control device comprising a control section configured to vibrate a contact region in a case where it is determined that an operation is performed on an input section by a target object coming into contact with the contact region, the input section having the contact region touched by the target object, wherein the control section adjusts displacement rise time as a control parameter for performing control of vibrating the contact region, the displacement rise time being required time from first time when displacement of the contact region caused by vibration becomes first displacement within a first predetermined range from a local minimum value of the displacement to second time when the displacement of the contact region caused by vibration becomes second displacement within a second predetermined range from a local maximum value of the displacement.

To solve the above described problem, according to another aspect of the present invention, there is provided a control method comprising vibrating a contact region in a case where it is determined that an operation is performed on an input section by a target object coming into contact with the contact region, the input section having the contact region touched by the target object, wherein vibrating the contact region includes adjusting displacement rise time as a control parameter for performing control of vibrating the contact region, the displacement rise time being required time from first time when displacement of the contact region caused by vibration becomes first displacement within a first predetermined range from a local minimum value of the displacement to second time when the displacement of the contact region caused by vibration becomes second displacement within a second predetermined range from a local maximum value of the displacement.

To solve the above described problem, according to another aspect of the present invention, there is provided a non-transitory computer readable medium having a program stored therein, the program causing a computer to function as a control section configured to vibrate a contact region in a case where it is determined that an operation is performed on an input section by a target object coming into contact with the contact region, the input section having the contact region touched by the target object, wherein the control section adjusts displacement rise time as a control parameter for performing control of vibrating the contact region, the displacement rise time being required time from first time when displacement of the contact region caused by vibration becomes first displacement within a first predetermined range from a local minimum value of the displacement to second time when the displacement of the contact region caused by vibration becomes second displacement within a second predetermined range from a local maximum value of the displacement.

Advantageous Effects of Invention

As described above, according to the present invention, it is possible to provide the mechanism that makes it possible to improve expressiveness of feedback.

MODE(S) FOR CARRYING OUT THE INVENTION

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Configuration Example

Figure 1:
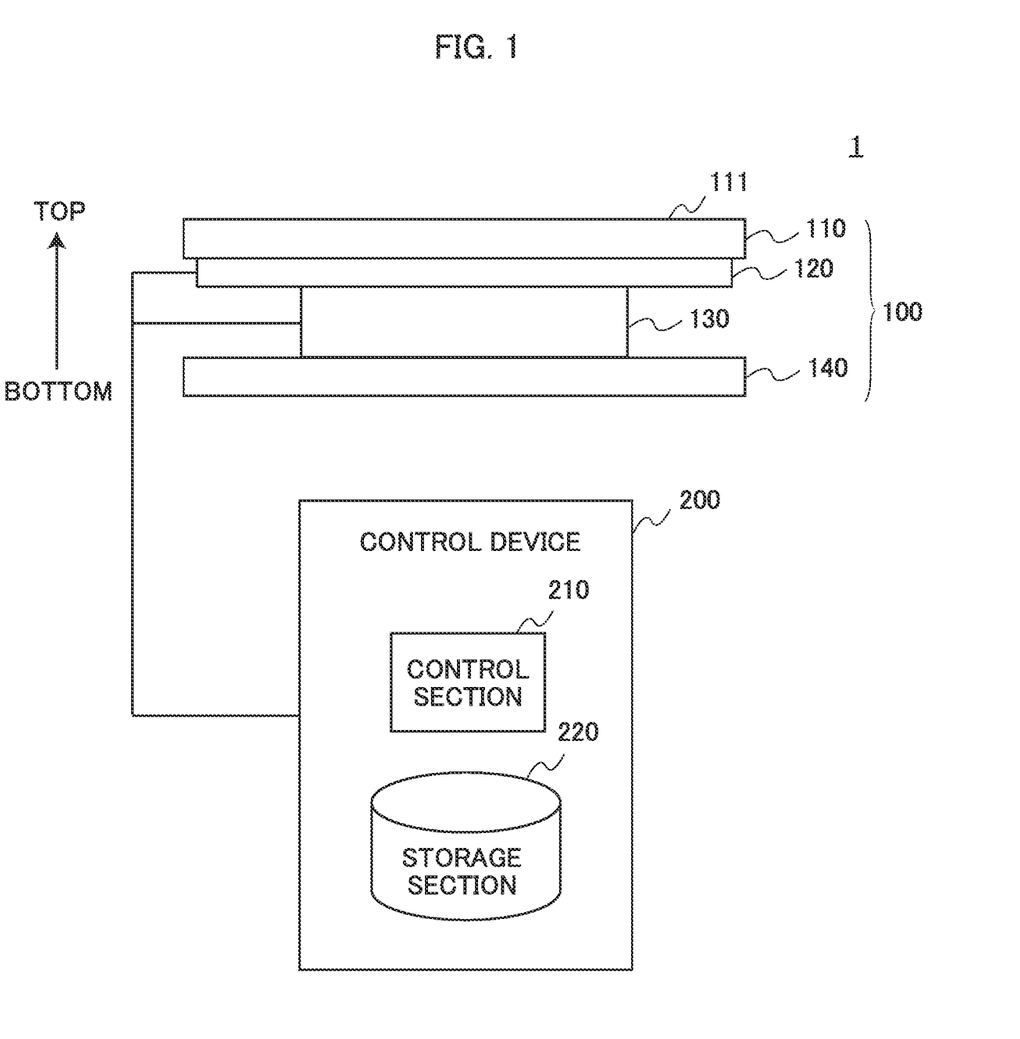
FIG. 1 is a diagram illustrating an example of configuration of a system according to an embodiment of the present disclosure.

FIG. 1 is a diagram illustrating an example of configuration of a system 1 according to an embodiment of the present disclosure. As illustrated in FIG. 1, the system 1 according to the present embodiment includes an input device 100 and a control device 200. In particular, FIG. 1 illustrates the input device 100 as a cross-sectional view. In addition, FIG. 1 illustrates the control device 200 as a block diagram.

(1) Input Device 100

The input device 100 is a device configured to receive an operation performed by a target object through contact. The target object is any object configured to input information by operating the input device 100. Examples of the target object include a finger of a user, a palm of a hand, various object held in the user's hand, and the like. Examples of the operation performed by a target object through contact include a press operation, which is an operation of pressing a contact region 111 on the operation reception section 110 (to be described later). The input device 100 is an example of an input section according to the present invention.

As illustrated in FIG. 1, the input device 100 includes the operation reception section 110, a detection section 120, an actuator 130, and a supporting material 140. In addition, as illustrated in FIG. 1, the operation reception section 110, the detection section 120, the actuator 130, and the supporting material 140 are provided in this order in one direction. With regard to the one direction, the side of the operation reception section 110 is also referred to as an upper side, and the side of the supporting material 140 is also referred to as a lower side.

The operation reception section 110 is a member configured to receive an operation performed by the target object through contact. The operation reception section 110 has a contact region 111 with which the target object comes into contact. The contact region 111 is a region with which the target object comes into contact.

According to the present embodiment, the operation reception section 110 may be configured as a touchscreen. In this case, the contact region 111 may have any shape such as a rectangular shape, a circular shape, or a rounded-corner box shape when viewed from above. Note that, the operation reception section 110 is not limited to the touchscreen as long as the operation reception section 110 is a member configured to receive the operation performed by the target object through contact. The operation reception section 110 may be configured as various kinds of button, various kinds of knobs, various kinds of levers, or the like as long as it receives the operation.

The detection section 120 is a sensor configured to output an index for detecting the operation performed via the operation reception section 110. For example, the detection section 120 according to the present embodiment may be a pressure-sensitive sensor configured to detect a pressure on the operation reception section 110. In addition, the detection section 120 transmits sensor information to the control device 200. The sensor information indicates the detected pressure.

Note that, the detection section 120 according to the present invention is not limited to the pressure-sensitive sensor. The detection section 120 may be a force sensor configured to detect and output a force applied to the operation reception section 100 or a load sensor configured to detect and output a load applied to the operation reception section 110 as long as the sensor is able to output an index for detecting an operation performed via the operation reception section 110. In addition, the detection section 120 may be a contact point of braking a conductive wire when the operation reception section 110 is operated.

The actuator 130 vibrates under the control of the control device 200. For example, the actuator 130 includes a linear motor actuator, a voice coil motor, and the like.

Here, the operation reception section 110, the detection section 120, and the actuator 130 are connected. Therefore, when the actuator 130 vibrates, the operation reception section 110 also vibrates in conjunction with the actuator 130.

The supporting material 140 is a member that supports structural elements of the input device 100. The supporting material 140 supports the actuator 130.

(2) Control Device 200

The control device 200 is a device configured to control overall operation of the system 1. As illustrated in FIG. 1, the control device 200 includes a control section 210 and a storage section 220.

The storage section 220 has a function of storing various kinds of information for operation performed by the control device 200. For example, the storage section 220 stores various kinds of criterion values of control parameters (to be described later). For example, the storage section 220 includes any storage medium such as flash memory and a read/write device configured to read and write information from and to the storage medium.

The control section 210 controls overall operation of the system 1. For example, the control section 210 is implemented by an electronic circuit such as a central processing unit (CPU), a microprocessing unit (MPU), and an electronic control unit (ECU). For example, the control section 210 vibrates the operation reception section 110 on the basis of sensor information received from the detection section 120. Specifically, the control section 210 determines whether or not an operation has been performed on the operation reception section 110 by the target object coming into contact with the contact region 111, on the basis of the sensor information. For example, the control section 210 determines that the operation has been performed in the case where a pressure detected by the detection section 120 exceeds a predetermined threshold. Alternatively, the control section 210 determines that the operation has not been performed in the case where the pressure detected by the detection section 120 does not exceed the predetermined threshold. Next, the control section 210 vibrates the operation reception section 110 (more specifically, the contact region 111) by vibrating the actuator 130 in the case where it is determined that the operation has been performed on the operation reception section 110 by the target object through contact. This allows the user to receive vibration feedback when operating the operation reception section 110 through contact.

2. Technical Features

The control section 210 adjusts the control parameters for performing control of vibrating the operation reception section 110. The control parameters are values that define vibration of the operation reception section 110. For example, the parameters that define the vibration include a parameter related to acceleration, a parameter related to displacement, and the like. The control section 210 generates a signal for outputting vibration based on the adjusted control parameters to the actuator 130, and inputs the generated signal to the actuator 130. This allows the actuator 130 and the operation reception section 110 to vibrate on the basis of the adjusted control parameters. In addition, by adjusting the control parameters, it is possible to create various sensations. In other words, appropriate adjustment of the control parameters allows the user to perceive a desired sensation. This makes it possible to improve expressiveness of the feedback. Details of the adjustment of the control parameters and the creation of various sensations will be described with reference to FIG. 2.

Figure 2:
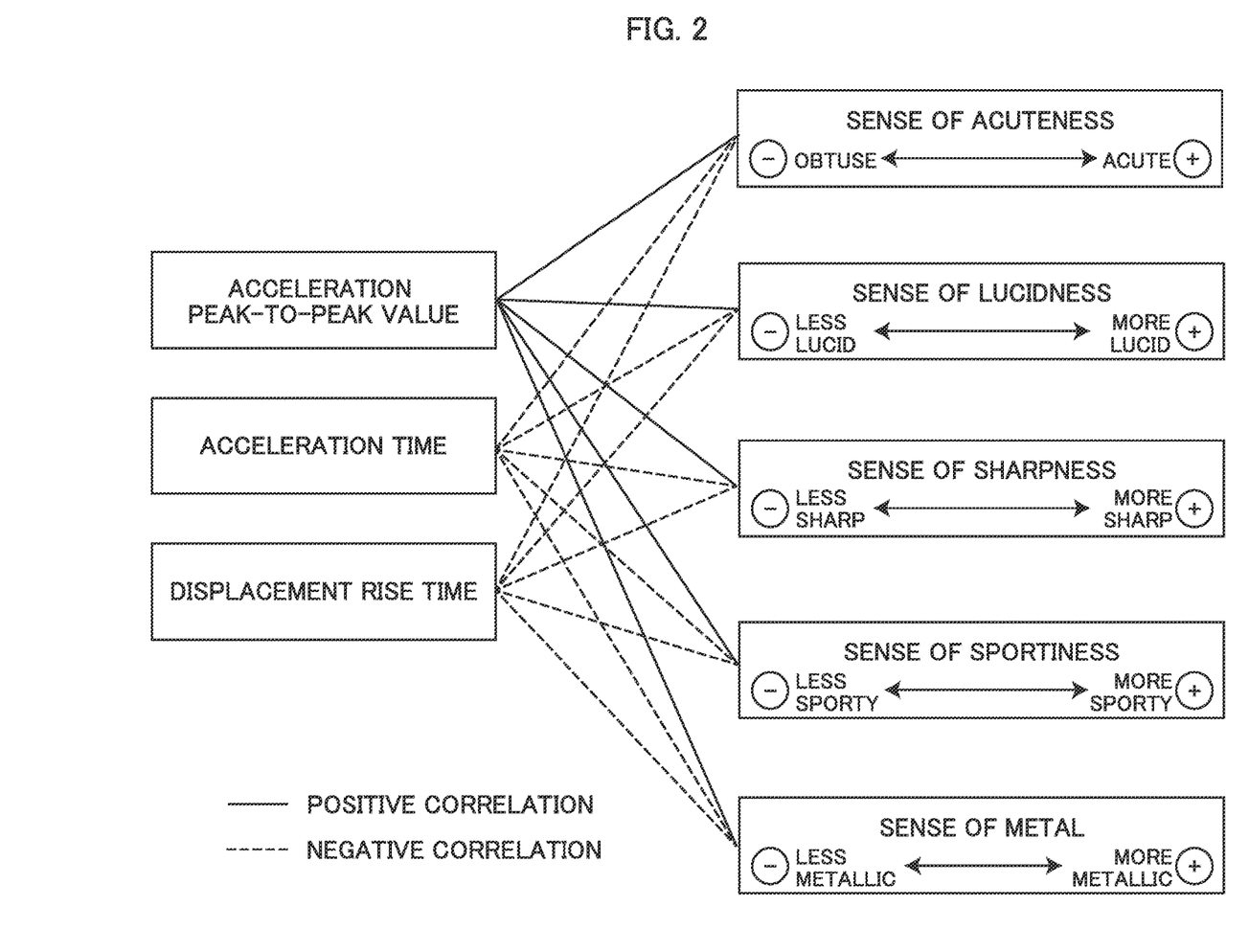
FIG. 2 is a diagram illustrating an example of relationship between control parameters and sensations created by adjusting the control parameters according to the embodiment.

FIG. 2 is a diagram illustrating an example of relationship between the control parameters and the sensations created by adjusting the control parameters according to the present embodiment. The control parameters are illustrated in the left side of FIG. 2, and the sensations are illustrated in the right side of FIG. 2. The relationship illustrated in FIG. 2 is revealed by experiments made by the present inventors. The present inventors made the experiments in which, when the control parameters were changed, the user performed the press operation on the input device 100, received feedback, and then answers which sensation the user perceived. In addition, the present inventors carried out a correlation analysis with regard to combinations of the control parameters and the sensations on the basis of results of the experiments on a plurality of users.

In FIG. 2, combinations of control parameters and sensations connected through solid line links each have positive correlation in which a correlation coefficient greater than or equal to a first threshold value is calculated. In other words, when a control parameter changes in a positive direction, a sensation connected to the control parameter through a solid line link also changes in the positive direction. Here, the change in the control parameter in the positive direction means increase in a value of the control parameter. In addition, the change in the sensation in the positive direction means increase in the sensation to be perceived by the user. On the other hand, when a control parameter changes in a negative direction, a sensation connected to the control parameter through a solid line link also changes in the negative direction. Here, the change in the control parameter in the negative direction means decrease in a value of the control parameter. In addition, the change in the sensation in the negative direction means decrease in the sensation to be perceived by the user. Note that, for example, the first threshold may be 0.6.

In FIG. 2, combinations of control parameters and sensations connected through dashed line links each have negative correlation in which a correlation coefficient less than or equal to a second threshold value is calculated. In other words, when a control parameter changes in the positive direction, a sensation connected to the control parameter through a dashed line link changes in the negative direction. On the other hand, when a control parameter changes in the negative direction, a sensation connected to the control parameter through a dashed line link changes in the positive direction. Note that, for example, the second threshold may be −0.6.

(1) Created Sensations

As illustrated in FIG. 2, the created sensations include sense of acuteness, sense of lucidness, sense of sharpness, sense of sportiness, and sense of metal. Next, details of the respective sensations will be described.

The sense of acuteness is a sensation felt as rapid change within a predetermined time period. With regard to the sense of acuteness, when a user perceives acuteness, the user feels change within the predetermined time period as rapid change. With regard to the sense of acuteness, when a user perceives obtuseness, the user feels change within the predetermined time period as slow change. Here, when the sense of acuteness changes in the positive direction, the user perceives stronger acuteness than a situation where the change does not occur. When the sense of acuteness changes in the negative direction, the user perceives stronger obtuseness than the situation where the change does not occur.

The sense of lucidness is a sensation indicating ease of perception of vibration. When a user perceives lucidness, the user easily feels the vibration. When a user perceives no lucidness, it is not easy to feel the vibration. Here, when the sense of lucidness changes in the positive direction, the user perceives stronger lucidness than the situation where the change does not occur. When the sense of lucidness changes in the negative direction, the user perceives weaker lucidness than the situation where the change does not occur.

The sense of sharpness is a sensation indicating a clear end of a goal. When a user perceives sharpness, the user clearly feels the end of the goal. When a user perceives no sharpness, the user feels a vague end of the goal. Here, when the sense of sharpness changes in the positive direction, the user perceives stronger sharpness than the situation where the change does not occur. When the sense of sharpness changes in the negative direction, the user perceives weaker sharpness than the situation where the change does not occur.

The sense of sportiness is a sensation of airiness and vividness. When a user perceives the sportiness, the user feels airiness and vividness. When the user perceives no sportiness, the user feels no airiness or vividness. Here, when the sense of sportiness changes in the positive direction, the user perceives stronger sportiness than the situation where the change does not occur. When the sense of sportiness changes in the negative direction, the user perceives weaker sportiness than the situation where the change does not occur.

The sense of metal indicates a sensation of heavy, small, high, and oneness. When a user perceives the sense of metal, the user feels heavy, small, high, and oneness. When a user perceives no sense of metal, the user does not feel heavy, small, high, or oneness. Here, when the sense of metal changes in the positive direction, the user perceives stronger sense of metal than the situation where the change does not occur. When the sense of metal changes in the negative direction, the user perceives weaker sense of metal than the situation where the change does not occur.

(2) Adjustment of Control Parameters

Examples of the control parameters to be adjusted include the displacement rise time. In the present embodiment, at least an acceleration peak-to-peak value or acceleration time may be used as the control parameter to be adjusted in addition to the displacement rise time. Next, details of adjustment of the respective control parameters will be described.

Displacement Rise Time

The displacement rise time is required time from first time when displacement of the operation reception section 110 (more specifically, the contact region 111) caused by vibration becomes first displacement within a first predetermined range from a local minimum value of the displacement to second time when the displacement of the operation reception section 110 (more specifically, the contact region 111) caused by vibration becomes second displacement within a second predetermined range from a local maximum value of the displacement. Here, the local minimum value may be a minimum value. In addition, the local maximum value may be a maximum value. Details of the displacement rise time will be described with reference to FIG. 3.

Figure 3:
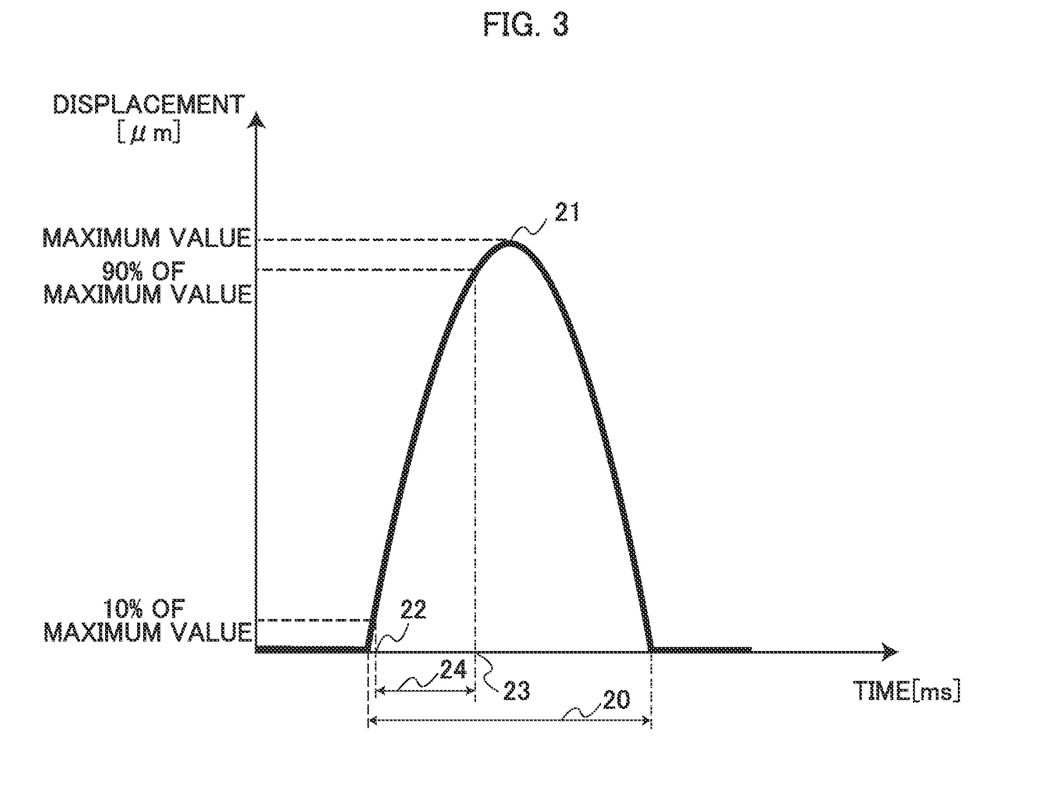
FIG. 3 is a diagram for describing an example of a control parameter according to the embodiment.

FIG. 3 is a diagram for describing an example of the control parameter according to the present embodiment. FIG. 3 illustrates a vertical axis representing the displacement of the operation reception section 110 caused by vibration. "Micrometer" is a unit of the displacement. FIG. 3 also illustrates a horizontal axis representing time. "Millisecond" is used as a unit of the time. FIG. 3 illustrates a time period 20, which is a time period where the actuator 130 outputs vibration under the control of the control section 210. Here, for example, one cycle of vibration is output in the time period 20. Even after the time period 20, the displacement may be caused by inertial vibration after the vibration of the actuator 130 is stopped under the control of the control section 210. Here, the displacement rise time serving as the control parameter may be limited to time that falls within a time period where the operation reception section 110 outputs vibration under the control of the control section 210. In other words, the displacement rise time serving as the control parameter does not have to include a time period where the operation reception section 110 vibrates through inertia. In the example illustrated in FIG. 3, the first predetermined range is 10% of a maximum value 21. The first displacement is displacement by 10% of the maximum value 21 from a minimum value which is zero. In addition, the second predetermined range is 10% of the maximum value 21. The second displacement is displacement by an amount obtained by subtracting 10% of the maximum value 21 from the maximum value 21, that is, by 90% of the maximum value 21. Therefore, displacement rise time 24 is a time period from first time 22 when displacement becomes 10% of the maximum value 21 of the displacement to second time 23 when the displacement becomes 90% of the maximum value 21 of the displacement.

Note that, the first predetermined range may be zero, and the second predetermined range may be zero. In this case, the displacement rise time is required time from time when a local minimum value (for example, minimum value) is obtained to time when a local maximum value (for example, maximum value) is obtained with regard to displacement of the operation reception section 110 caused by vibration. In other words, the displacement rise time is a time period from when the vibration starts to when the local maximum displacement is obtained.

The control section 210 adjusts the displacement rise time. This makes it possible to adjust sensations to be perceived by a user such as the sense of acuteness, sense of lucidness, sense of sharpness, sense of sportiness, and sense of metal as illustrated in FIG. 2. As illustrated in FIG. 2, the displacement rise time has negative correlation with the sense of acuteness, sense of lucidness, sense of sharpness, sense of sportiness, and sense of metal. Therefore, by adjusting the displacement rise time toward the positive direction, it is possible to change these sensations in the negative direction. Alternatively, by adjusting the displacement rise time toward the negative direction, it is possible to change these sensations in the positive direction.

For example, the control section 210 may adjust the displacement rise time in such a manner that the displacement rise time exceeds a first criterion value. For example, the first criterion value is displacement rise time when vibration of the operation reception section 110 is perceptible. For example, the first criterion value may be 0. Softer vibration is obtained as the displacement rise time increases. Therefore, the user becomes less likely to perceive the vibration. In addition, as illustrated in FIG. 2, through the above-described adjustment, it is possible for the user to perceive the stronger obtuseness, weaker lucidness, weaker sharpness, weaker sportiness, and weaker sense of metal than the situation where the displacement rise time is not adjusted.

Note that, as the first criterion value, it is also possible to use unadjusted displacement rise time. In this case, it is possible to perform control more flexibly and cause the user to perceive the obtuseness but no lucidness, no sharpness, no sportiness, or no sense of metal, by adjusting the displacement rise time in such a manner that the displacement rise time exceeds the first criterion value.

For another example, the control section 210 may adjust the displacement rise time in such a manner that the displacement rise time becomes less than a second criterion value. For example, the second criterion value is displacement rise time when vibration of the operation reception section 110 is imperceptible. For example, the second criterion value may be infinity. Sharper vibration is obtained as the displacement rise time decreases. Therefore, it is possible for the user to perceive the vibration more easily. In addition, as illustrated in FIG. 2, through the above-described adjustment, it is possible for the user to perceive the stronger acuteness, lucidness, sharpness, sportiness, and sense of metal than a situation where the displacement rise time is not adjusted. Alternatively, the second criterion value may be displacement rise time when vibration of the operation reception section 110 is perceptible. In this case, the user perceives both vibration based on adjusted displacement rise time and vibration based on unadjusted displacement rise time. Therefore, it is possible for the user to clearly perceive change in the sensations caused by the adjustment.

Note that, as the second criterion value, it is also possible to use unadjusted displacement rise time. In this case, it is possible to perform control more flexibly and cause the user to perceive the acuteness, lucidness, sharpness, sportiness, and sense of metal by adjusting the displacement rise time in such a manner that the displacement rise time becomes less than the second criterion value.

Acceleration Peak-to-Peak Value

The acceleration peak-to-peak value is an amount of change between a local maximum value and a local minimum value of acceleration applied by vibration to the operation reception section 110 (more specifically, the contact region 111). Here, the local minimum value may be a minimum value. In addition, the local maximum value may be a maximum value. Details of the acceleration peak-to-peak value will be described with reference to FIG. 4.

Figure 4:
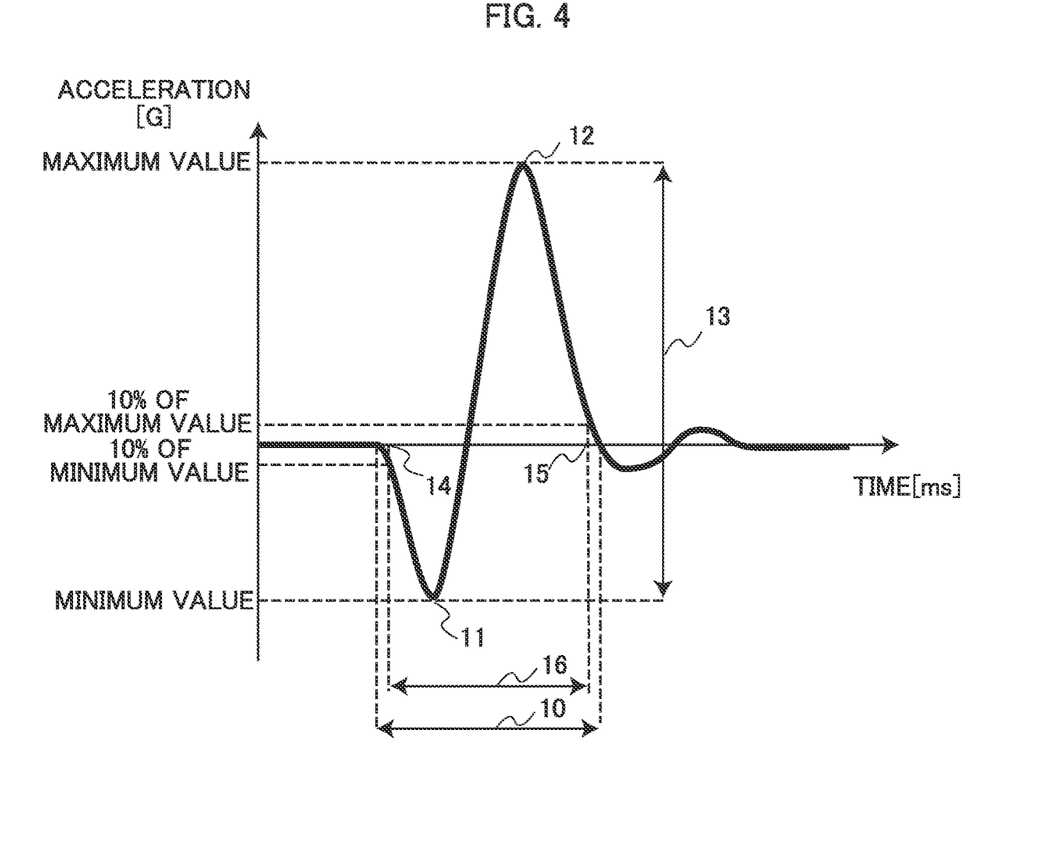
FIG. 4 is a diagram for describing an example of a control parameter according to the embodiment.

FIG. 4 is a diagram for describing an example of the control parameter according to the present embodiment. FIG. 4 illustrates a vertical axis representing the acceleration applied by vibration to the operation reception section 110. "G" is used as a unit of the acceleration. FIG. 4 also illustrates a horizontal axis representing time. "Millisecond" is used as a unit of the time. FIG. 4 illustrates a time period 10, which is a time period where the actuator 130 outputs vibration under the control of the control section 210. Here, for example, one cycle of vibration is output in the time period 10. Even after the time period 10, change in the acceleration is change in acceleration of the operation reception section 110 caused by inertial vibration after the vibration of the actuator 130 is stopped under the control of the control section 210.

The acceleration peak-to-peak value serving as the control parameter may be limited to an acceleration peak-to-peak value that falls within a time period where the operation reception section 110 outputs vibration under the control of the control section 210. In other words, the acceleration peak-to-peak value serving as the control parameter does not have to include an acceleration peak-to-peak value that falls within the time period where the inertial vibration is output. In the example illustrated in FIG. 4, an acceleration peakto-peak value 13 is a difference between a local maximum value 12 and a local minimum value 11 of acceleration applied by one cycle of vibration to the operation reception section 110 within a time period 10.

The control section 210 adjusts the acceleration peak-to-peak value. As illustrated in FIG. 2, the acceleration peak-to-peak value has positive correlation with the sense of acuteness, sense of lucidness, sense of sharpness, sense of sportiness, and sense of metal. Therefore, by adjusting the acceleration peak-to-peak value toward the positive direction, it is possible to change these sensations in the positive direction. Alternatively, by adjusting the acceleration peak-to-peak value toward the negative direction, it is possible to change these sensations in the negative direction.

For example, the control section 210 may adjust the acceleration peak-to-peak value in such a manner that the acceleration peak-to-peak value exceeds a third criterion value. For example, the third criterion value is an acceleration peak-to-peak value at which vibration of the operation reception section 110 is imperceptible. For example, the third criterion value may be 0. The vibration gets stronger as the acceleration peak-to-peak value increases. Therefore, it is possible for the user to perceive the vibration more easily. Therefore, it is possible for the user to perceive the vibration in the case where an adjusted acceleration peak-to-peak value is the acceleration peak-to-peak value at which the vibration of the operation reception section 110 is perceptible. In addition, as illustrated in FIG. 2, through the above-described adjustment, it is possible for the user to perceive the stronger acuteness, lucidness, sharpness, sportiness, and sense of metal than a situation where the displacement rise time is not adjusted. Alternatively, the third criterion value may be an acceleration peak-to-peak value at which vibration of the operation reception section 110 is perceptible. In this case, the user perceives both vibration based on an adjusted acceleration peak-to-peak value and vibration based on an unadjusted acceleration peak-to-peak value. Therefore, it is possible for the user to clearly perceive change in the sensations caused by the adjustment.

Note that, as the third criterion value, it is also possible to use the unadjusted acceleration peak-to-peak value. In this case, it is possible to perform control more flexibly and cause the user to perceive the acuteness, lucidness, sharpness, sportiness, and sense of metal by adjusting the acceleration peak-to-peak value in such a manner that the acceleration peak-to-peak value exceeds the third criterion value.

For another example, the control section 210 may adjust the acceleration peak-to-peak value in such a manner that the acceleration peak-to-peak value becomes less than a fourth criterion value. For example, the fourth criterion value is the acceleration peak-to-peak value at which vibration of the operation reception section 110 is perceived as pain. For example, the fourth criterion value may be infinity. The control section 210 makes the acceleration peak-to-peak value smaller than the fourth criterion value. This makes it possible to alleviate pain to be perceived by the user. In addition, as illustrated in FIG. 2, through the above-described adjustment, it is possible for the user to perceive the stronger obtuseness, weaker lucidness, weaker sharpness, weaker sportiness, and weaker sense of metal than the situation where the displacement rise time is not adjusted. Alternatively, the fourth criterion value may be an acceleration peak-to-peak value at which vibration of the operation reception section 110 is perceptible or an acceleration peak-to-peak value that is not perceived as pain. In this case, the user perceives both vibration based on an adjusted acceleration peak-to-peak value and vibration based on an unadjusted acceleration peak-to-peak value without any pain. Therefore, it is possible for the user to clearly perceive change in the sensations caused by the adjustment.

In addition, as the fourth criterion value, it is also possible to use the unadjusted acceleration peak-to-peak value. In this case, it is possible to perform control more flexibly and cause the user to perceive the obtuseness but no lucidness, no sharpness, no sportiness, or no sense of metal, by adjusting the acceleration peak-to-peak value in such a manner that the acceleration peak-to-peak value becomes less than the fourth criterion value.

Acceleration Time

The acceleration time is a time period from time when acceleration applied by vibration to the operation reception section 110 (more specifically, the contact region 111) becomes a first rate value based on a first extreme value of the acceleration for the first time to time when the acceleration becomes a second rate value based on a second extreme value of the acceleration for the last time. Here, the first extreme value may be a local minimum value or a local maximum value. In addition, the second extreme value may also be a local minimum value or a local maximum value. In the case where the first extreme value is the local maximum value, the second extreme value is desirably the local minimum value. On the other hand, in the case where the first extreme value is the local minimum value, the second extreme value is desirably the local maximum value. Note that, the local minimum value may be a minimum value. In addition, the local maximum value may be a maximum value.

In the case where acceleration applied for the first time to the operation reception section 110 after the start of vibration is positive acceleration, the acceleration time starts when the acceleration becomes a first rate value for the first time. The first rate value is based on the local maximum value of acceleration (which is an example of the first extreme value). Alternatively, in the case where acceleration applied for the first time to the operation reception section 110 after the start of vibration is negative acceleration, the acceleration time starts when the acceleration becomes a first rate value for the first time. The first rate value is based on the local minimum value of acceleration (which is an example of the first extreme value).

On the other hand, in the case where last acceleration applied to the operation reception section 110 before the end of vibration is positive acceleration, the acceleration time ends when the acceleration becomes a second rate value for the last time. The second rate value is based on the local maximum value of acceleration (which is an example of the second extreme value). Alternatively, in the case where last acceleration applied to the operation reception section 110 before the end of vibration is negative acceleration, the acceleration time ends when the acceleration becomes a second rate value for the last time. The second rate value is based on the local minimum value of acceleration (which is an example of the second extreme value).

Here, the acceleration time serving as the control parameter may be limited to time that falls within a time period where the operation reception section 110 outputs vibration under the control of the control section 210. In other words, the acceleration time serving as the control parameter does not have to include a time period where the operation reception section 110 vibrates through inertia. Note that, each of the first rate and the second rate is any rate of 0% to 100%. In the example illustrated in FIG. 4, the acceleration time 16 is a time period from time 14 when the acceleration becomes 10% of the minimum value of the acceleration for the first time to time 15 when the acceleration becomes 10% of the maximum value of the acceleration for the last time, with regard to one cycle of vibration within the time period 10.

Note that, the first rate and the second rate may be 0%. In this case, the acceleration time is a time period from time when acceleration applied by vibration to the operation reception section 110 becomes zero for the first time to time when the acceleration becomes zero for the last time. In other words, the acceleration time is a time period from start to stop of the vibration.

The control section 210 adjusts the acceleration time. As illustrated in FIG. 2, the acceleration time has negative correlation with the sense of acuteness, sense of lucidness, sense of sharpness, sense of sportiness, and sense of metal. Therefore, by adjusting the acceleration time toward the positive direction, it is possible to change these sensations in the negative direction. Alternatively, by adjusting the acceleration time toward the negative direction, it is possible to change these sensations in the positive direction.

For example, the control section 210 may adjust the acceleration time in such a manner that the acceleration time exceeds a fifth criterion value. For example, the fifth criterion value is acceleration time when vibration of the operation reception section 110 is perceptible. For example, the fifth criterion value may be 0. Softer vibration is obtained as the acceleration time increases. Therefore, the user becomes less likely to perceive the vibration. In addition, as illustrated in FIG. 2, through the above-described adjustment, it is possible for the user to perceive the stronger obtuseness, weaker lucidness, weaker sharpness, weaker sportiness, and weaker sense of metal than the situation where the displacement rise time is not adjusted.

Note that, as the fifth criterion value, it is also possible to use unadjusted acceleration time. In this case, it is possible to perform control more flexibly and cause the user to perceive the obtuseness but no lucidness, no sharpness, no sportiness, or no sense of metal, by adjusting the acceleration time in such a manner that the acceleration time exceeds the fifth criterion value.

For another example, the control section 210 may adjust the acceleration time in such a manner that the acceleration time becomes less than a sixth criterion value. For example, the sixth criterion value is acceleration time when vibration of the operation reception section 110 is imperceptible. For example, the sixth criterion value may be infinity. Sharper vibration is obtained as the acceleration time decreases. Therefore, it is possible for the user to perceive the vibration more easily. In addition, as illustrated in FIG. 2, through the above-described adjustment, it is possible for the user to perceive the stronger acuteness, lucidness, sharpness, sportiness, and sense of metal than a situation where the displacement rise time is not adjusted. Alternatively, the sixth criterion value may be acceleration time when vibration of the operation reception section 110 is perceptible. In this case, the user perceives both vibration based on adjusted acceleration time and vibration based on unadjusted acceleration time. Therefore, it is possible for the user to clearly perceive change in the sensations caused by the adjustment.

Note that, as the sixth criterion value, it is also possible to use unadjusted acceleration time. In this case, it is possible to perform control more flexibly and cause the user to perceive the acuteness, lucidness, sharpness, sportiness, and sense of metal by adjusting the acceleration time in such a manner that the acceleration time becomes less than the sixth criterion value.

(3) Combination of Adjustments of Control Parameters

The control section 210 adjusts the displacement rise time as the control parameter. In addition, the control section 210 may adjust another control parameter in addition to the displacement rise time.

For example, the control section 210 may adjust the acceleration peak-to-peak value in addition to the displacement rise time. As illustrated in FIG. 2, the acceleration peak-to-peak value is in common with the displacement rise time in that the acceleration peak-to-peak value and the displacement rise time are connected to the sense of acuteness, sense of lucidness, sense of sharpness, sense of sportiness, and sense of metal through links. However, the correlation between the acceleration peak-to-peak value and the sensations connected to the acceleration peak-to-peak value through the links is the positive correlation, but the correlation between the displacement rise time and the sensations connected to the acceleration time through the links is the negative correlation, which is opposite to the positive correlation between the acceleration peak-to-peak value and the sensations. Therefore, in the case of adjusting both the acceleration peak-to-peak value and the displacement rise time, the control section 210 changes the acceleration peak-to-peak value and the displacement rise time in different directions (positive or negative direction). This makes it possible to enhance the change in the sensations in the positive direction or the negative direction. The sensations are common to the acceleration peak-to-peak value and the displacement rise time and are connected to the acceleration peak-to-peak value and the displacement rise time through the links.

Specifically, the control section 210 adjusts the acceleration peak-to-peak value in such a manner that the acceleration peak-to-peak value exceeds the third criterion value in a case of adjusting the displacement rise time in such a manner that the displacement rise time becomes less than the second criterion value. This makes it possible to cause the user to perceive the stronger acuteness, lucidness, sharpness, sportiness, sense of metal, and the like than the case of adjusting the acceleration peak-to-peak value or the displacement rise time alone. On the other hand, the control section 210 adjusts the acceleration peak-to-peak value in such a manner that the acceleration peak-to-peak value becomes less than the fourth criterion value in a case of adjusting the displacement rise time in such a manner that the displacement rise time exceeds the first criterion value. This makes it possible to cause the user to perceive the stronger obtuseness, weaker lucidness, weaker sharpness, weaker sportiness, weaker sense of metal, and the like than the case of adjusting the acceleration peak-to-peak value or the displacement rise time alone.

For another example, the control section 210 may adjust the acceleration time in addition to the displacement rise time. As illustrated in FIG. 2, the displacement rise time is in common with the acceleration time in that the displacement rise time and the acceleration time are connected to the sense of acuteness, sense of lucidness, sense of sharpness, sense of sportiness, and sense of metal through links. In addition, the correlation between the displacement rise time and the sensations connected to the displacement rise time through the links is the negative correlation, and the correlation between the acceleration time and the sensations connected to the acceleration time through the links is also the negative correlation. Therefore, in the case of adjusting both the displacement rise time and the acceleration time, the control section 210 changes the displacement rise time and the acceleration time in a same direction (positive or negative direction). This makes it possible to enhance the change in the sensations in the positive direction or the negative direction. The sensations are common to the displacement rise time and the acceleration time and are connected to the displacement rise time and the acceleration time through links.

Specifically, the control section 210 adjusts the acceleration time in such a manner that the acceleration time exceeds the fifth criterion value in the case of adjusting the displacement rise time in such a manner that the displacement rise time exceeds the first criterion value. This makes it possible to cause the user to perceive the stronger obtuseness, weaker lucidness, weaker sharpness, weaker sportiness, weaker sense of metal, and the like than the case of adjusting the displacement rise time or the acceleration time alone. On the other hand, the control section 210 adjusts the acceleration time in such a manner that the acceleration time becomes less than the sixth criterion value in the case of adjusting the displacement rise time in such a manner that the displacement rise time becomes less than the second criterion value. This makes it possible to cause the user to perceive the stronger acuteness, stronger lucidness, stronger sharpness, stronger sportiness, stronger sense of metal, and the like than the case of adjusting the displacement rise time or the acceleration time alone.

(4) Flow of Process

Figure 5:
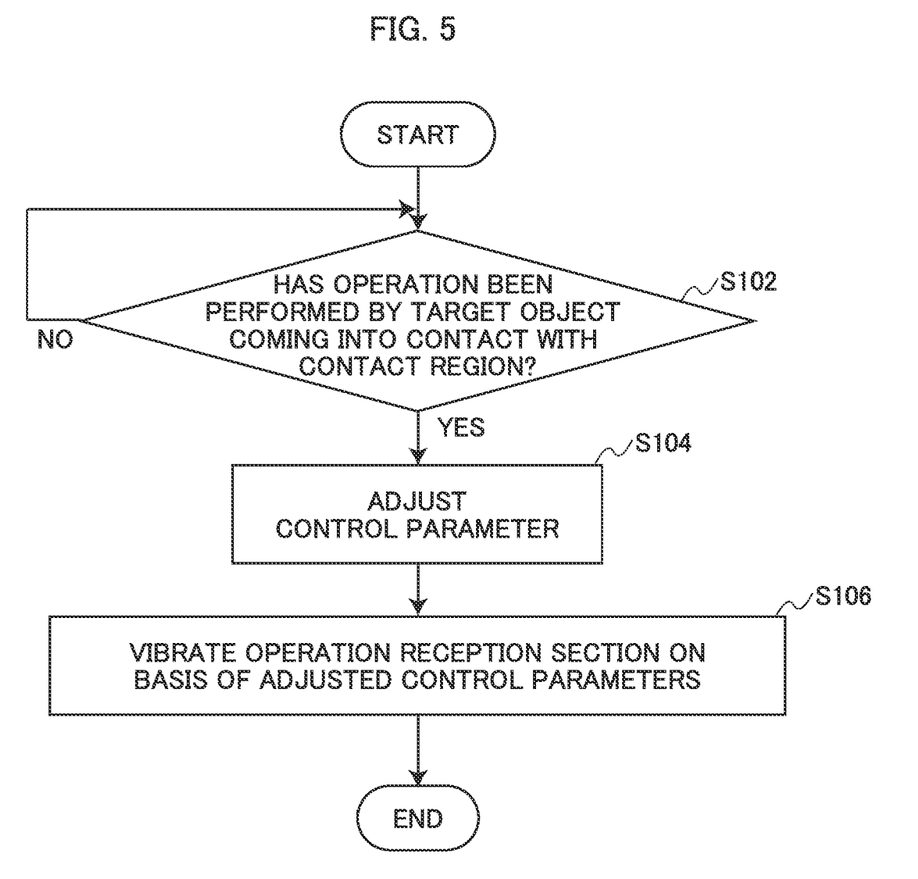
FIG. 5 is a flowchart illustrating an example of a flow of a feedback process executed by the system according to the embodiment.

Next, with reference to FIG. 5, a flow of a feedback process according to the present embodiment will be described. FIG. 5 is a flowchart illustrating an example of the flow of the feedback process executed by the system 1 according to the present embodiment.

As illustrated in FIG. 5, the control section 210 first determines whether or not an operation has been performed by the target object coming into contact with the contact region 111 (Step S102). In the case where it is determined that the operation has not been performed (NO in Step S102), the process returns to Step S102. On the other hand, in the case where it is determined that the operation has been performed (YES in Step S102), the process proceeds to Step S104.

In Step S104, the control section 210 adjusts the control parameter. Specifically, the control section 210 adjusts the displacement rise time. In this case, the control section 210 may adjust at least the acceleration peak-to-peak value or the acceleration time, in addition to the displacement rise time. Next, the control section 210 vibrates the operation reception section 110 on the basis of the adjusted control parameters (Step S106). Specifically, the control section 210 generates a signal for outputting vibration based on the adjusted control parameters to the actuator 130, and inputs the generated signal to the actuator 130. This allows the actuator 130 to vibrate on the basis of the adjusted control parameters, and the operation reception section 110 also vibrates on the basis of the adjusted control parameters.

3. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, the above embodiment has been described on the assumption that the control parameter is a value that defines the vibration of the operation reception section 110. However, the present invention is not limited thereto. For example, as the control parameter, it is possible to adjust a function for outputting the value that defines the vibration of the operation reception section 110.

For example, the above embodiment has been described on the assumption that the operation reception section 110 outputs one cycle of vibration under the control of the control section 210. However, the present invention is not limited thereto. For example, the operation reception section 110 may output a plurality of cycles of vibration under the control of the control section 210.

For example, the above embodiment has been described on the assumption that it is determined whether an operation has been performed on the basis of a pressure detected by the detection section 120. However, the present invention is not limited thereto. For example, the operation reception section 110 may have a function of detecting coordinates of a contact position of the target object in the contact region 111. In this case, it is determined whether an operation has been performed on the basis of whether or not the coordinates of the contact position of the target object has been detected in the contact region 111.

For example, the above embodiment has been described on the assumption that the operation performed by the target object is the press operation. However, the present invention is not limited thereto. For example, the operation reception section 110 may have a function of detecting coordinates of a contact position of the target object in the contact region 111. Next, the operation performed by the target object may be a touch operation performed by the target object coming into contact with the contact region 111, or may be a slide operation performed by the target object moving in the contact region 111 while being in contact with the contact region 111.

Note that, the various kinds of criterion values used for adjusting the control parameters may be fixed or variable. For example, the criterion values may change over time. As an example, a criterion value may be a value of the control parameter decided during last adjustment. In this case, it is possible to cause the user to perceive sensations having different intensity from last adjustment.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using the flowcharts are not necessarily executed in the order illustrated in the drawings. Some processing steps may be executed in parallel. In addition, additional processing steps may be employed and some processing steps may be omitted.

REFERENCE SIGNS LIST 1 system
100 system
110 operation reception section
120 detection section 130 actuator
140 supporting material
200 control device
210 control section
220 storage section

The invention claimed is:

1. A control device comprising
a control section configured to vibrate a contact region in a case where it is determined that an operation is performed on an input section by a target object coming into contact with the contact region, the input section having the contact region touched by the target object,
wherein the control section adjusts a displacement rise time as a control parameter for performing control of vibrating the contact region, the displacement rise time being a required time from a first time when displacement of the contact region caused by vibration becomes a first displacement within a first predetermined range from a local minimum value of the displacement to a second time when the displacement of the contact region caused by the vibration becomes a second displacement within a second predetermined range from a local maximum value of the displacement,
wherein the control section adjusts an acceleration peak-to-peak value to be a larger value when the displacement rise time is adjusted to be a smaller value, and adjusts the acceleration peak-to-peak value to be a smaller value when the displacement rise time is adjusted to be a larger value,
wherein the control section controls an acceleration time and the displacement rise time as control parameters and the acceleration time is a time period from when acceleration applied by vibration to the contact region becomes a first rate value based on a first extreme value of the acceleration for a first time to when the acceleration becomes a second rate value based on a second extreme value of the acceleration for a last time, and
wherein the control section adjusts the acceleration time in such a manner that an acceleration time becomes less than a sixth criterion value in a case of adjusting the displacement rise time in such a manner that the displacement rise time becomes less than a second criterion value, the second criterion value is the displacement rise time when the vibration of the contact region is imperceptible, and the sixth criterion value is the acceleration time when the vibration of the contact region is imperceptible.

2. The control device according to claim 1, wherein
the control section adjusts the displacement rise time in such a manner that the displacement rise time exceeds a first criterion value, and
the first criterion value is the displacement rise time when vibration of the contact region is perceptible.

3. The control device according to claim 1, wherein
the control section adjusts the displacement rise time in such a manner that the displacement rise time becomes less than a second criterion value, and
the second criterion value is the displacement rise time when vibration of the contact region is imperceptible.

4. The control device according to claim 1, wherein
the control section controls the acceleration peak-to-peak value and the displacement rise time as control parameters, and
the acceleration peak-to-peak value is a difference between the local maximum value and the local minimum value of acceleration applied by the vibration to the contact region.

5. The control device according to claim 4, wherein
the control section adjusts the acceleration peak-to-peak value in such a manner that the acceleration peak-to-peak value exceeds a third criterion value in a case of adjusting the displacement rise time in such a manner that the displacement rise time becomes less than a second criterion value,
the second criterion value is the displacement rise time when vibration of the contact region is imperceptible, and
the third criterion value is the acceleration peak-to-peak value at which the vibration of the contact region is imperceptible.

6. The control device according to claim 4, wherein
the control section adjusts the acceleration peak-to-peak value in such a manner that the acceleration peak-to-peak value becomes less than a fourth criterion value in a case of adjusting the displacement rise time in such a manner that the displacement rise time exceeds a first criterion value,
the first criterion value is the displacement rise time when vibration of the contact region is perceptible, and
the fourth criterion value is the acceleration peak-to-peak value at which vibration of the contact region is perceived as pain.

7. The control device according to claim 1, wherein
the control section adjusts the acceleration time in such a manner that the acceleration time exceeds a fifth criterion value in a case of adjusting the displacement rise time in such a manner that the displacement rise time exceeds a first criterion value,
the first criterion value is the displacement rise time when vibration of the contact region is perceptible, and
the fifth criterion value is the acceleration time when the vibration of the contact region is perceptible.

8. A control method comprising:
vibrating a contact region in a case where an operation is performed on an input section by a target object coming into contact with the contact region, the input section having the contact region touched by the target object,
wherein the vibrating the contact region includes adjusting a displacement rise time as a control parameter for performing control of the vibrating the contact region, the displacement rise time being a required time from a first time when displacement of the contact region caused by vibration becomes a first displacement within a first predetermined range from a local minimum value of the displacement to a second time when the displacement of the contact region caused by the vibration becomes a second displacement within a second predetermined range from a local maximum value of the displacement,
wherein the vibrating the contact region further includes adjusting an acceleration peak-to-peak value to be a larger value when the displacement rise time is adjusted to be a smaller value, and adjusts the acceleration peak-to-peak value to be a smaller value when the displacement rise time is adjusted to be a larger value,
wherein a control section controls an acceleration time and the displacement rise time as control parameters and the acceleration time is a time period from when acceleration applied by vibration to the contact region becomes a first rate value based on a first extreme value of the acceleration for a first time to when the acceleration becomes a second rate value based on a second extreme value of the acceleration for a last time, and wherein the control section adjusts the acceleration time in such a manner that an acceleration time becomes less than a sixth criterion value in a case of adjusting the displacement rise time in such a manner that the displacement rise time becomes less than a second criterion value, the second criterion value is the displacement rise time when the vibration of the contact region is imperceptible, and the sixth criterion value is the acceleration time when the vibration of the contact region is imperceptible.

9. A non-transitory computer readable medium having a program stored therein, the program causing a computer to function as:
   a control section configured to vibrate a contact region in a case where it is determined that an operation is performed on an input section by a target object coming into contact with the contact region, the input section having the contact region touched by the target object,
   wherein the control section adjusts a displacement rise time as a control parameter for performing control of vibrating the contact region, the displacement rise time being a required time from a first time when displacement of the contact region caused by vibration becomes a first displacement within a first predetermined range from a local minimum value of the displacement to a second time when the displacement of the contact region caused by the vibration becomes a second displacement within a second predetermined range from a local maximum value of the displacement,
   wherein the control section adjusts an acceleration peak-to-peak value to be a larger value when the displacement rise time is adjusted to be a smaller value, and adjusts the acceleration peak-to-peak value to be a smaller value when the displacement rise time is adjusted to be a larger value,
   wherein the control section controls an acceleration time and the displacement rise time as control parameters and the acceleration time is a time period from when acceleration applied by vibration to the contact region becomes a first rate value based on a first extreme value of the acceleration for a first time to when the acceleration becomes a second rate value based on a second extreme value of the acceleration for a last time, and
   wherein the control section adjusts the acceleration time in such a manner that an acceleration time becomes less than a sixth criterion value in a case of adjusting the displacement rise time in such a manner that the displacement rise time becomes less than a second criterion value, the second criterion value is the displacement rise time when the vibration of the contact region is imperceptible, and the sixth criterion value is the acceleration time when the vibration of the contact region is imperceptible.

* * * * *